Figure 1:
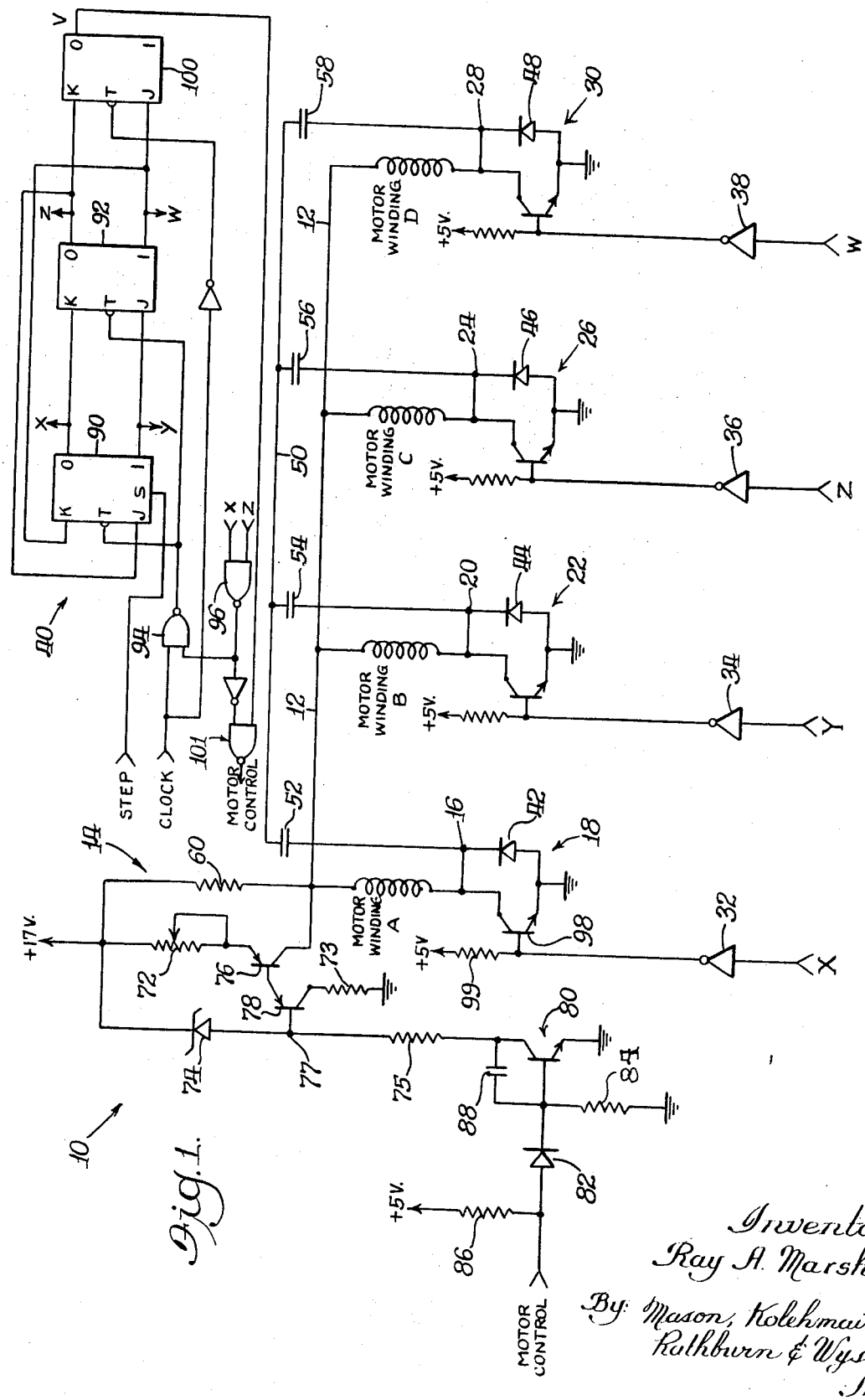

United States Patent
Marshall

[15] 3,659,176
[45] Apr. 25, 1972

[54] STEPPING MOTOR CONTROL INCLUDING A HIGH LEVEL SUPPLY FOR STEPPING AND A LOW LEVEL SUPPLY FOR HOLDING

[72] Inventor: Ray A. Marshall, Park Ridge, Ill.
[73] Assignee: SCM Corporation, New York, N.Y.
[22] Filed: Nov. 13, 1969
[21] Appl. No.: 876,539

[52] U.S. Cl. ............................ 318/696, 318/138, 318/442
[51] Int. Cl. ........................................................ H02k 37/00
[58] Field of Search ............... 318/138, 254, 696, 685, 442; 310/44

[56] References Cited

UNITED STATES PATENTS

| | | | |
|---|---|---|---|
| 3,443,181 | 5/1969 | Kozol et al. | 318/138 |
| 3,523,230 | 8/1970 | York | 318/685 |
| 3,355,646 | 11/1967 | Goto | 318/138 |
| 3,385,984 | 5/1968 | O'Regan | 318/138 X |
| 3,402,334 | 9/1968 | Newton | 318/138 |
| 3,424,961 | 1/1969 | Leenhouts | 318/138 |
| 3,444,447 | 5/1969 | Newell | 318/138 |
| 3,452,263 | 6/1969 | Newell | 318/138 |
| 3,476,996 | 11/1969 | Fredriksen | 318/254 X |
| 3,486,096 | 12/1969 | Van Cleave | 318/138 |

Primary Examiner—G. R. Simmons
Attorney—Mason, Kolehmainen, Rathburn & Wyss

[57] ABSTRACT

A control circuit for high speed operation of a four winding stepping motor. When the stepping motor is to be advanced, a large constant amplitude current is supplied to a node common to the four windings. A waveform generator then sequentially energizes the windings so as to advance the motor. A low level holding current is supplied to the windings at all times when the motor is not advancing.

1 Claims, 2 Drawing Figures

STEPPING MOTOR CONTROL INCLUDING A HIGH LEVEL SUPPLY FOR STEPPING AND A LOW LEVEL SUPPLY FOR HOLDING

The present invention relates to motor control circuits, and more particularly to control circuitry for stepping motors of the type containing four windings which, when energized in the proper sequence, cause the motor to advance.

Stepping motors have come into wide use in all fields where precision movement under digital control is required. Such motors can be used, for example, to advance the paper in a high speed printer, punch, or reader. Stepping motors can be precisely controlled by conventional digital logic, and do not require the use of rotary converters or other feedback devices to achieve accurate positioning under digital control.

In the past it has been customary to energize a four winding stepping motor by supplying a constant potential cyclically to each of its four windings in a pattern which forces the motor to advance. Generally each winding is connected in series with a switching element to form a series circuit, and the four resulting series circuits are connected across a constant potential source of power. A digitally controlled complex wave generator then cyclically actuates the switching elements as required to advance the motor.

A motor energized in this manner responds rather slowly, and must be energized at a relatively slow rate of speed. This is because heavy control currents cannot be developed quickly in the motor windings. The inductive reactance of the motor windings resists the initial flow of heavy control currents. If the motor supply voltage and added series resistance were large enough to decrease the current rise time and to produce adequate torque at fast step rates, it could be too large for safe operation when the motor is not rotating. Also such a source would be heavily drained by the motor and would have to continuously supply large amounts of power to the motor circuitry, most of which would be lost as heat. Hence, the use of stepping motors in high speed control systems has been limited, except in cases where economics have allowed utilization of an extremely complex motor energization system.

A primary object of the present invention is, therefore, to provide a simple and inexpensive stepping motor control system which can, in effect, overdrive a stepping motor, thereby providing a substantially faster rate of speed with increased torque and less power consumption than has heretofore been practicable.

Another object of the present invention is the obtention of a simple control system which provides a large amplitude constant current to the windings of a stepping motor during periods when the stepping motor is advanced, and which provides a low level holding current to the windings at all other times.

A further object of the present invention is the provision of a control system which suppresses transients in the motor windings, and which utilizes the transient behavior of the motor windings to further increase the speed at which the motor responds to control.

In accordance with these and many other objects, a control system designed in accordance with the present invention comprises briefly a stepping motor energization circuit which delivers a controlled, constant current to the windings within a stepping motor. This current has a large amplitude during periods when the motor is advancing, and a small amplitude during all other periods. The four windings are also connected to a constant potential current sink by four switching elements. The switching elements are then connected to any suitable stepping motor waveform generator, such as two flip-flops interconnected to form a switch-tail ring counter circuit.

Normally a low level current is supplied to the windings. This low level current is sufficient in magnitude to hold the stepping motor in position and to prevent it from moving. When it is desired to advance the stepping motor, this low level current is replaced by a constant high level current source, and appropriate motor advance control signals are supplied to the switching elements to advance the stepping motor. When a winding is first supplied with current, a large voltage is developed which quickly establishes current flow through the winding. The voltage across the winding falls off automatically, however, as the current reaches its limited value, so the windings are never subjected to excessively high currents. In addition, a series of ringing capacitors and damper diodes reverse the flow of current in deenergized windings and use these reverse currents to aid in overcoming the back EMF of newly energized windings. Thus, the stepping motor is advanced at the maximum practicable speed.

Further objects and advantages of the present invention will become apparent as the following detailed description proceeds, and the features of novelty which characterize the present invention will be pointed out with particularity in the claims annexed to and forming a part of this specification.

Figure 2:
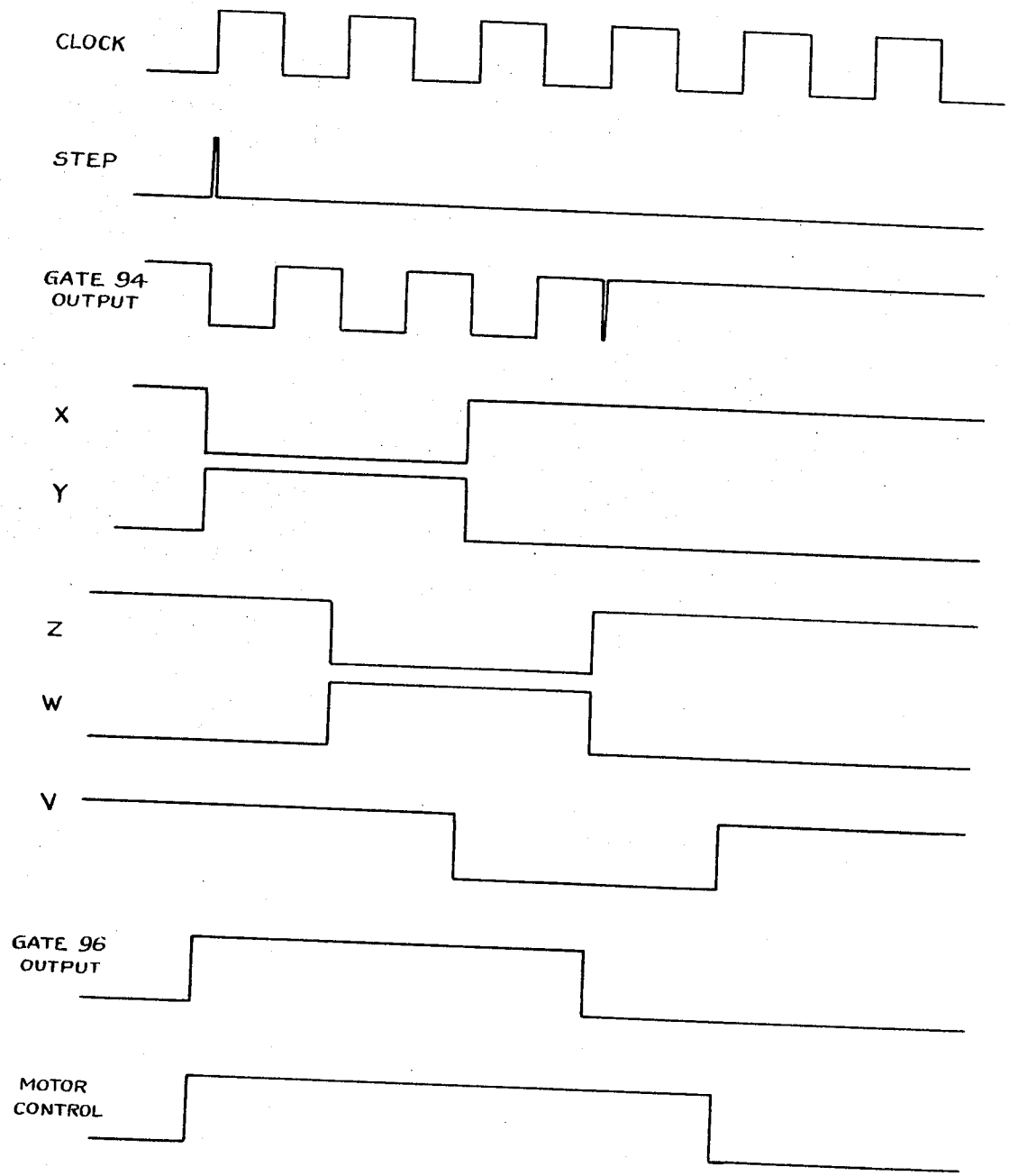

FIG. 1 is a partly logical and partly schematic diagram of a control system for a paper or record drive stepping motor designed in accordance with the present invention; and FIG. 2 is a timing diagram illustrating the operation of the control system shown in FIG. 1.

Referring now to the drawings, the control system, which is indicated generally as 10, is designed to control the actuation of a stepping motor (not shown) having four windings that are labelled A, B, C, and D. Each of the windings A to D has one end connected to a current source node 12. The current source node 12 receives a constant current from a current source that is indicated generally by the reference numeral 14. The opposite end of the motor winding A is connected to a node 16. Node 16 is connected to ground by a switching circuit indicated generally as 18. Similarly, the motor windings B, C, and D are respectively connected to nodes 20, 24, and 28, and the nodes 20, 24, and 28 are respectively connected to ground by switching circuits 22, 26, and 30. Inverting buffer amplifiers 32, 34, 36, and 38 convert logical signals X, Y, Z, and W into signal levels suitable for controlling the switching circuits 18, 22, 26, and 30. The signals X, Y, Z, and W are generated by a stepping motor advance waveform generator 40 that includes two flip-flops 90 and 92 interconnected to form a switch-tail ring counter circuit. The waveform generator also generates a motor control signal which controls the operation of the current source 14. Damper diodes 42, 44, 46, and 48 are connected directly across the switching circuits 18, 22, 26, and 30 with their anodes connected to ground and their cathodes connected to the nodes 16, 20, 24, and 28. The nodes 16, 20, 24, and 28 are also respectively connected to a common node 50 by four capacitors 52, 54, 56, and 58.

Normally the control circuit 10 is in a stand-by state. The motor control signal is at ground level, and the current source 14 supplies a low level current to the current source node 12 through a resistor 60. The waveform generator 40 provides high level or positive X and Z signals and low level or ground level Y and W signals. These signals are inverted by the amplifiers 32, 34, 36, and 38. The high level X and Z signals open the switching circuits 18 and 26, while the low level Y and W signals close the switching circuits 22 and 30. Hence, the motor windings B and D are connected between the current source node 12 and ground by the switching circuits 22 and 30, while the motor windings A and C are disconnected from ground. Current flows through the resistor 60 and through the windings B and D, and thus sustains the stepping motor in its rest position and prevents any changes in torque from displacing the motor by any significant amount.

When the stepping motor is advanced, the motor control signal goes positive and causes the current source 14 to supply a high level constant current to the current source node 12. Simultaneously, the waveform generator 40 begins generating a low level X signal and a high level Y signal, as shown in FIG. 2, and these signals close the switching circuit 18 and open the switching circuit 22. Since only a small current was initially flowing in the winding B, this opening of the switching circuit 22 causes little ringing of any significance. The high current supplied to the node 12 is now forced to flow through the windings A and D, since only the switching circuits 18 and 30 are closed. The current source 14 connects the two windings A and D directly across the +17 volt supply, and thus produces a fast initial rise in current. As the reactance effect diminishes, the current source 14 limits the flow of current to a safe magnitude. In this manner a high level current flow is quickly developed through both the windings A and D and the constant current source 14 maintains the flow of current through the windings A and D at a safe level. These large currents cause the stepping motor to rapidly advance from its initial rest position towards a new position of equilibrium.

At about the time the motor reaches its new equilibrium position, the waveform generator 40 begins to generate a low level Z signal and a high level W signal. These signals open the switching circuit 30 and close the switching circuit 26. The opening of the switching circuit 30 leaves a large current flowing through motor winding D with no place to go. This current must flow into the capacitor 58 and through capacitors 52 and 56 to ground. The capacitor 58 thus rings with the motor winding D for half a cycle, and this causes a half cycle large amplitude positive sinusoidal voltage to appear at the node 28. The capacitor 58 is chosen large enough to limit the peak value of the sinusoidal potential to within the maximum ratings of the switching circuit 30, yet small enough so as not to significantly extend the time during which the winding D remains energized. During the course of this half cycle transient, current flow through the motor winding D reverses its direction. When this reversal of current flow is complete, the node 28 attempts to swing negative with respect to ground, but is prevented from doing so by the damper diode 48. Current now flows away from ground, through the diode 48 to the node 28, through the motor winding D and towards the current source node 12. This current adds to the current which flows from the constant current source 14 so that momentarily the current supplied to the current source mode 12 is increased.

This extra heavy current flow into the current source node 12 has to flow through the motor windings A and C to ground, since only the switching circuits 18 and 26 are closed. It will be remembered that the motor winding A is already carrying a current approximately equal in magnitude to half that supplied by the source 14. The current flow in motor winding A is therefore increased slightly, and a new current flow is induced in motor winding C. The reactance of both these windings momentarily resists the increased current flow, so once again the current source 14 supplies the full supply voltage to the windings A and C and quickly establishes the proper level of current flow. The stepping motor now advances towards a new equilibrium position.

Next the waveform generator 40 generates a high level X signal and a low level Y signal. This opens the switching circuit 18 and closes the switching circuit 22. In exactly the manner explained above, the current flow through the winding A is first reversed and then reduced to zero, and current flow through the motor winding B is quickly established at a high level. A heavy current now flows through the motor windings B and C, and the stepping motor advances once again to an equilibrium position that is defined by the physical locations of the windings B and C within the motor. The stepping motor has now rotated three quarters of the way between two equilibrium positions defined by energization of the windings B and D.

Finally the waveform generator 40 recommences generating a high level Z signal and a low level W signal, and a heavy current flow is reestablished in the windings B and D. The stepping motor advances once again to an equilibrium position defined by the physical locations of the windings B and D, and finally comes to a halt. The motor control signal is maintained until the stepping motor stops moving, and then is terminated. This shuts down the current source 14 and leaves only the resistor 60 supplying current to the windings B and D. The stepping motor is now at rest, and the light current flow through the windings B and D holds it in this rest position so that it can resist any external torque which might be applied.

The primary advantage of the above arrangement is the high speed at which it can advance the stepping motor. By using a constant current source to energize the windings, a high initial voltage is developed without any danger of excessively heavy currents. Ringing potentials are used to induce reverse currents in the windings and to supplement the large amplitude supply currents, and only a low level sustaining current is used to hold the motor in position during periods when the motor is not being advanced. A substantial increase is thus obtained in the speed at which the motor is accelerated to speed, advanced, and stopped in its new position without any significant increase in the stand-by power drain. This particular embodiment of the control circuit is used to energize a teleprinter line feed motor.

The constant current source 14 includes three parts. The first part is a resistor 60 which connects the current source node 12 to a high level potential and which continuously supplies a low magnitude current to the current source node 12. The second part is a switchable constant current source that includes the elements 72 through 78, and the third part is a transistor switch 80 which energizes the constant current source 72 – 78 whenever the motor control signal is present.

The switchable constant current source 72 – 78 supplies a high level current to the current source node 12 whenever energized by the transistor switch 80. A zener diode 74 is connected in series with a resistor 75 and the transistor switch 80 between a positive source of potential and ground so as to provide a reference potential at a reference node 77 whenever the switch 80 is closed. Transistors 76 and 78 then apply this reference potential to a variable resistor 72 in such a manner that the potential across the variable resistor 72 is always maintained approximately equal to the reference potential. The resistor 72 is connected between the high voltage source and the emitter of the transistor 76. The base of transistor 76 is then connected to the emitter of the transistor 78, and the base of transistor 78 is connected to the reference node 77. A resistor 73 connects the collector of the transistor 78 to ground, and thus prevents excessive currents from flowing into the base of the transistor 76 in case the zener diode 74 becomes an open circuit. This resistor 73 also reduces the heat dissipation in the collector of the transistor 78. A constant current flows through the variable resistor 72 because a constant voltage is maintained across this resistor. The magnitude of this constant current is adjusted by varying the resistance of the variable resistor 72. Since the collector current of a transistor is almost identically equal to the emitter current, a constant current flows from the collector of the transistor 76, and this constant current is almost identical in magnitude to the current which flows through the resistor 72. This constant current is fed to the current source node 12 and from there to the motor windings A, B, C, and D.

The transistor switch 80 is connected between ground and one end of the resistor 75. Normally the transistor switch 80 is open, and no current flows through the resistor 75 to sustain the operation of the zener diode 74. The zener diode 74 then turns off the transistors 78 and 76, and only the small current which flows through the resistor 60 reaches the current source node 12. When the transistor switch 80 is closed, it initiates a heavy constant current flow from the high voltage source, through the variable resistor 72 and the transistor 76, and into the current source node 12.

The transistor switch 80 is controlled by the motor control signal. This signal flows through a diode 82 to the base of the transistor switch 80. A resistor 84 provides a low impedance path between the base of the transistor 80 and ground, and thus reduces the magnitude of the leakage currents which flow from the collector of the transistor 80. A resistor 86 connects the cathode of the diode 82 to a positive potential point and adds extra positive current drive to the motor control signal. The diode 82 provides increased noise immunity at the input to the transistor switch 80. A capacitor 88 is connected between the base and collector of the transistor 80 as a high frequency negative feedback path which suppresses transients and slows the rate at which the current flow from the constant current source 14 is reduced in magnitude when the switch 80 opens.

The stepping motor advance waveform generator 40 comprises basically two conventionally JK flip-flops 90 and 92 interconnected so as to form a switch-tail ring counter circuit. The 0 and 1 outputs of the first flip-flop 90 are fed respectively into the K and J inputs of a second flip-flop 92, but the 0 and 1 outputs of the second flip-flop 92 are reversed before being fed respectively into the J and K inputs of the flip-flop 90. The clock or trigger inputs of the flip-flops 90 and 92 are connected parallelly to the output of a gate 94. The gate 94 receives as input signals an externally generated clock pulse signal which determines the speed at which the stepping motor advances, and also the signal which is generated by a gate 96. The 0 outputs of the flip-flops 90 and 92 are respectively the X and Z signals, and the 1 outputs of the flip-flops 90 and 92 are respectively the Y and W signals. The gate 96 has as inputs the X and Z signals. The flip-flop 90 also has a direct set input labelled S which is actuated by an externally generated STEP pulse whenever it is desired to advance the stepping motor.

When the waveform generator 40 is in its stand-by or rest state, both of the flip-flops 90 and 92 are in the 0 state, and thus the X and Z signals are at a high level while the Y and W signals are at a low level. An external clock pulse signal is connected to the clock terminal of gate 94 and continuously supplies time spaced pulses whose spacing indicates when the different windings in the stepping motor are to be energized. However, the gate 94 is disabled by the gate 96 output signal which is at a low level. The gate 96 generates a low level signal because both of its inputs are now at a high level. Therefore, the clock pulses are unable to pass through the gate 94 to advance the ring counter, and hence the generator 40 is in a stand-by state.

When it is desired to advance the stepping motor, a step pulse, generated synchronously with the leading edge of a clock pulse as shown in FIG. 2, is applied to the S or set input of the flip-flop 90. This sets the flip-flop 90 and drives the X signal to a low level. This low level X signal causes the output of the gate 96 to go positive and to enable the gate 94. The gate 94 allows clock pulses to reach the flip-flops 90 and 92 and thus initiates operation of the generator 40. The next three clock pulses advance the switch-tail ring counter circuit, as shown in FIG. 2. The first clock pulse sets the flip-flop 92, the second clock pulse clears the flip-flop 90, and the third clock pulse clears the flip-flop 92. This generates the proper combination of the X, Y, Z, and W signals to advance the stepping motor through a complete cycle. The gate 96 is now once again supplied with two positive level inputs, and thus generates a low level output which once again disables the gate 94. Hence, each time a step pulse is supplied to the set terminal of the flip-flop 90, the stepping motor advances through a complete cycle of four positions. The motor control signal which controls the current source 14 is the output of the gate 96 ORed together with the out-put of a third flip-flop 100. The flip-flop 100 has J and K inputs connected in shift register fashion to the 1 and 0 outputs of the flip-flop 92 and is clocked or toggled by inverted clock pulses, as shown in FIG. 1. The 0 output of the flip-flop 100 and the inverted output of the gate 96 are combined by a NAND gate 101 to form the motor control signal. As is shown in FIG. 2, the motor control signal goes positive when the step pulse occurs, and then remains positive for four complete clock pulses. The motor control signal thus supplies a heavy constant current to the stepping motor while it advances, and disables the current source 14 at all other times.

The switching circuit 18 comprises a switching transistor 98 having its emitter connected to ground, its collector connected to the node 16, and its base connected both to the output of the gate 32 and to a positive reference potential source by a resistor 99. When the output of the gate 32 is positive, this output, plus current flow through the resistor 99, combined to saturate the transistor 98, and the transistor 98 short circuits the node 16 to ground. When the output of the gate 32 is at ground level, it cuts off the flow of current through the transistor 98 and thus renders the gate 18 an open circuit. The switches 22, 26, and 30 are all identical to the switch 18, and function in exactly the same manner as the switch 18.

What is claimed as new and desired to be secured by Letters Patent of the United States is:

1. A control circuit for a stepping motor having first, second, third, and fourth windings, said control circuit comprising:

first, second, third, and fourth switching circuits each having control inputs;

first, second, third, and fourth series circuits each including one of said windings and one of said switching circuits as series elements;

a parallel circuit formed by connecting said series circuits in parallel with one another;

a constant current source connected in series with said parallel circuit to form a fifth series circuit; said constant current source having two terminals and comprising a sixth series circuit including a resistor and a controllable current regulating element, a reference potential source, and amplification means for controlling the current regulating element so as to maintain the voltage across the resistor proportional to the reference potential; said reference potential source comprising a zener diode having a first terminal connected to a terminal of the resistor and a second terminal connected to both the amplification means and to a source of current, wherein said source of current is normally shut off and is turned on only during periods when the stepping motor is advanced;

a source of electrical energy parallelly connected to said fifth series circuit; and waveform generating means connected to the control inputs of said switching circuits for sequentially energizing said windings so as to advance said stepping motor.

* * * * *